United States Patent
Desoli et al.

(10) Patent No.: US 8,606,976 B2
(45) Date of Patent: Dec. 10, 2013

(54) DATA STREAM FLOW CONTROLLER AND COMPUTING SYSTEM ARCHITECTURE COMPRISING SUCH A FLOW CONTROLLER

(75) Inventors: Giuseppe Desoli, Como (IT); Jean-Philippe Cousin, Quaix en Chartreuse (FR); Gilles Pelissier, Eybens (FR); Badr Bentaybi, Bevenais (FR)

(73) Assignees: STMicroelectronics (Grenoble 2) SAS, Grenoble (FR); STMicroelectronics S.r.l., Agrate Brianza (Milan) (IT)

( * ) Notice: Subject to any disclaimer, the term of this patent is extended or adjusted under 35 U.S.C. 154(b) by 55 days.

(21) Appl. No.: 12/818,653

(22) Filed: Jun. 18, 2010

(65) Prior Publication Data

US 2010/0325318 A1 Dec. 23, 2010

(30) Foreign Application Priority Data

Jun. 23, 2009 (EP) .................................... 09305590

(51) Int. Cl.
*G06F 3/00* (2006.01)
*G06F 15/173* (2006.01)

(52) U.S. Cl.
USPC ................ 710/29; 710/36; 709/232; 709/233

(58) Field of Classification Search
None
See application file for complete search history.

(56) References Cited

U.S. PATENT DOCUMENTS

| | | | |
|---|---|---|---|
| 5,604,742 A * | 2/1997 | Colmant et al. | 370/396 |
| 6,618,354 B1 * | 9/2003 | Sharma | 370/229 |
| 6,678,756 B1 * | 1/2004 | Tseng et al. | 710/52 |
| 6,847,369 B2 * | 1/2005 | Lavelle et al. | 345/558 |
| 7,139,271 B1 * | 11/2006 | Parruck et al. | 370/392 |
| 7,424,553 B1 * | 9/2008 | Borrelli et al. | 709/250 |
| 2005/0149665 A1 * | 7/2005 | Wolrich et al. | 711/105 |
| 2006/0050690 A1 * | 3/2006 | Epps et al. | 370/359 |
| 2006/0150034 A1 * | 7/2006 | Si et al. | 714/48 |
| 2006/0251109 A1 * | 11/2006 | Muller et al. | 370/463 |
| 2007/0010205 A1 * | 1/2007 | Wielage | 455/63.3 |
| 2009/0072856 A1 * | 3/2009 | Subramaniam et al. | 326/38 |

FOREIGN PATENT DOCUMENTS

GB 2 399 662 9/2004

OTHER PUBLICATIONS

European Search Report, EP 09 30 5590, Oct. 14, 2009.

* cited by examiner

*Primary Examiner* — Michael Sun
(74) *Attorney, Agent, or Firm* — Gardere Wynne Sewell LLP

(57) ABSTRACT

A data stream flow-controller controls a transfer of data between a data processing device and an interconnection network. The flow controller includes interfaces for interfacing the controller on the network side and on the processing device side, a configurable storage for buffering queues of data in the controller before transfer to destination, and a programmable controller to control the storage to define queue parameters.

20 Claims, 11 Drawing Sheets

FIG.8

| Register name | Size | Usage | xPE Offset | Access xPE Mode | Access ext Mode | Reset value | Comment |
|---|---|---|---|---|---|---|---|
| XFC_VQ_STATUS | 32 | Push/Pop | 0x0 | RO | RO | 0x20000 | Contains status of the vq (ex: enable), backlog set, credit protocol activate ... |
| XFC_VQ_CONTROL | 32 | Push/Pop | 0x4 | WO | WO | 0x0 | Enable to validate vq, setup backlog, and flush queue. |
| XFC_VQ_SIZE | 32 | Push/Pop | 0x8 | RO | RO | 0x0 | Contains current size of the queue. |
| XFC_VQ_ERROR | 32 | Push/Pop | 0x18 | RW | RW | 0x0 | Contains errors which occur on queues. |
| XFC_VQ_ERROR_MSK | 32 | Push/Pop | 0x1C | RW | RW | 0x0 | Enable to reset errors which occur on queues. |
| RESERVED | | | 0x1F | | | | Reserved |
| BLACKLOG REGISTERS | | | | | | | |
| XFC_VQ_BL_LOCAL_ADD | 32 | Push/Pop | 0x20 | RW | RW | 0x0 | Defines xPE LM address of the queue |
| XFC_VQ_B_CUR_SIZE | 32 | Push/Pop | 0x24 | RW | RW | 0x0 | Provides current size (number of elements) of the queue |
| XFC_VQ_BL_SIZE_MAX | 32 | Push/Pop | 0x28 | RW | RW | 0x0 | Defines maximum size (in bytes) of the queue (in back log) |
| XFC_VQ_BL_TAIL_PTR | 32 | Push/Pop | 0x2C | RO | RO | 0x80000000 | Contains address of the queue (tail and head addresses in the local memory) |
| XFC_VQ_BL_HEAD_PTR | 32 | Push/Pop | 0x30 | RO | RO | 0x80000000 | Contains address of the queue (tail and head addresses in the local memory) |
| RESERVED | | | 0x4F-0x34 | | | | Reserved |
| CREDIT PROTOCOL | | | | | | | |
| XFC_VQ_CRED_TRIG | 32 | Push/Pop | 0x50 | RW | RW | 0x0 | This register is used in the push context to ask for a credit (see XFC_VQ_CRED_CNT regiter). In the pop context, it provides number of elements that must be taken by xPE before sending a credit to initiator |
| XFC_VQ_CRED_CNTADD | 32 | Push/Pop | 0x54 | WO | WO | 0x0 | The register is used for credit protocol to increment XFC_VQ_CRED_CNT counter |
| XFC_VQ_CRED_CNT | 32 | Push/Pop | 0x58 | RW | RW | 0x0 | This register is used in the push context to provide number of elements that target can accept. In the pop context, it provides number of elements taken by xPE |
| RESERVED | | | 0x5C-0x54 | | | | Reserved |
| POP DEDICATED | | | | | | | |
| XFC_VQ_SIGNAL | 32 | Pop | 0x60 | RO | RO | 0x0 | Provides last signal content and control over it |
| PUSH DEDICATED | | | | | | | |
| XFC_VQ_TRANS_CFG | 32 | Push | 0x70 | RW | RW | 0x00050001 | Defines the transfer mode (burst size, trigger ...) |
| MISCEANELOUS | | | | | | | |
| XFC_VQ_REMOTE_ADD | 32 | Push | 0x80 | RW | RW | 0x0 | Defines address of destination (used either in the push or pop context) |
| LOCK | | | | | | | |
| XFC_VQ_LOCK | 32 | | 0x90 | RW | RW | 0x0 | Enables to lock/unlock queue |

DATA STREAM FLOW CONTROLLER AND COMPUTING SYSTEM ARCHITECTURE COMPRISING SUCH A FLOW CONTROLLER

PRIORITY CLAIM

This application claims priority from European Patent Application No. 09305590.3 filed Jun. 23, 2009, the disclosure of which is hereby incorporated by reference.

TECHNICAL FIELD

The invention relates, in general, to on-chip communication architectures and is, in particular, directed to a controller for controlling data streaming between electronic components through an interconnection network such as a so-called Network on-Chip.

According to another aspect, the invention also relates to the field of computing system architectures based on multi-processing systems.

BACKGROUND

Due to the convergence of consumer electronics and internet-based services, many functions tend to be combined into a single device.

This convergence involves all fields of computing and communications, wires and networks, middleware, applications, services, and the like.

Besides, as concerns silicon technology, a major effort is made in order to reduce the chip count, integrating more and more functions into a single chip.

Multiprocessing systems have thus been proposed to achieve the delicate balance between programmable cores, special-purpose engines and dedicated logic to address complexity, performance capacity, power consumption, area and future scalability.

In addition, researchers have proposed the so-called System on-Chip concept (SoC) to overcome the limitations relating to the huge efforts necessary to adequately design computing system architectures.

Interconnections between programmable engines or microprocessors play a critical role in the deployment of multiprocessing architectures.

As concerns the System on-Chip, the Network on-Chip, which provides communication between the programmable engines, constitutes one of the main aspects to be considered for the operation and for the flexibility of the entire SoC. In particular, interconnection interfaces are of great importance and must be designed carefully as they constitute a critical link in the communication chain and must operate efficiently, with low latency while allowing full flexibility to the wild range of protocols that software will require to be run on top of them.

These efficient and flexible hardware primitives must be in addition few and simple to implement, so as to reduce costs and increase speed of operation.

In addition, they must be flexible enough so that multiple communication mechanisms and protocols can be implemented on top of them.

Although researchers have already proposed remote DMA and remote queues solutions for high performance computing systems, no cost effective solution has been proposed in the field of an embedded System on-Chip.

In view of the foregoing, a need exists for providing a multiprocessor architecture permitting the provision to a user of a simple and efficient way to program cores without taking into consideration the data transfer aspect between said cores.

SUMMARY

Accordingly, it is hereby proposed, according to a first aspect, a data stream flow controller for controlling a transfer of data between a data processing device and an interconnection network.

This data stream flow controller comprises means for interfacing the controller on the network side and on the processing device side, configurable storing means for buffering queues of data in the controller before transfer to destination, and programmable control means to control the storing means to define queue parameters.

According to another feature of the flow controller said memory means comprises a set of First-In-First-Out memories each associated with corresponding programmable control means.

Said controller means may comprise a register for each First-In-First-Out memory in which are stored queue parameters.

This controller may further comprise an additional memory for providing memory extension for the storing means.

For example, said additional memory is a memory space reserved in the processing device local memory.

It may further comprise a dedicated register to control storage within the additional memory.

The data flow controller may be used for controlling a transfer of data and a transfer of signals. In such a case, the data and the signals may be merged in the additional memory.

For example, each memory element of said additional memory in which the signal is stored is linked by a pointer to the next memory element in which the signal is stored.

A first register may be used to store the address of the first signal and a second register may be used to store the address of the last signal. In addition, means are used to compare a read address with the address in the first register to detect if a fetched element from the additional memory is a signal.

Further means can be provided to transfer data according to a credit protocol.

For example, said means comprise a first credit counter register which represents the number of elements that can be sent to a target device and which is decremented when an element is sent to said target device.

The data flow controller may further comprise, at a destination side, a second credit counter register which represents the number of elements that have been forwarded and means for comparing the value of said second credit counter with a threshold value to write the programmable control means of an initiator remote data stream flow-controller.

The flow controller may further comprise at least one global control register to control and configure said data flow controller.

For example, said means for interfacing the controller comprise a first slave interface on a processing device side which manages load and store operations sent by a processing device, a second master interface on a processing element side which sends load and store operations to the processing device, a third interface on the network side to send load and store and push operations to the network and a fourth interface on the network side to receive load and store and push operations from the network.

According to another aspect, a computing system architecture comprises a cluster of processors, a set of electronic components and a network between said cluster of processors and said set of components.

This architecture may further comprise a streaming engine comprising a set of processor devices, an interconnection network and a set of data stream flow controllers as defined above connected between each processing device and said interconnection network.

According to a further aspect, the invention is also directed to a cellular phone comprising a computing architecture as defined above.

BRIEF DESCRIPTION OF THE DRAWINGS

Other advantages and features of the data stream flow controller and of the computing system architecture according to the present disclosure will appear on examining the following description, given only by way of example and in view of the following drawings in which:

FIG. 8 illustrates the mapping of the programmable control registers;

DETAILED DESCRIPTION OF THE DRAWINGS

Figure 1:
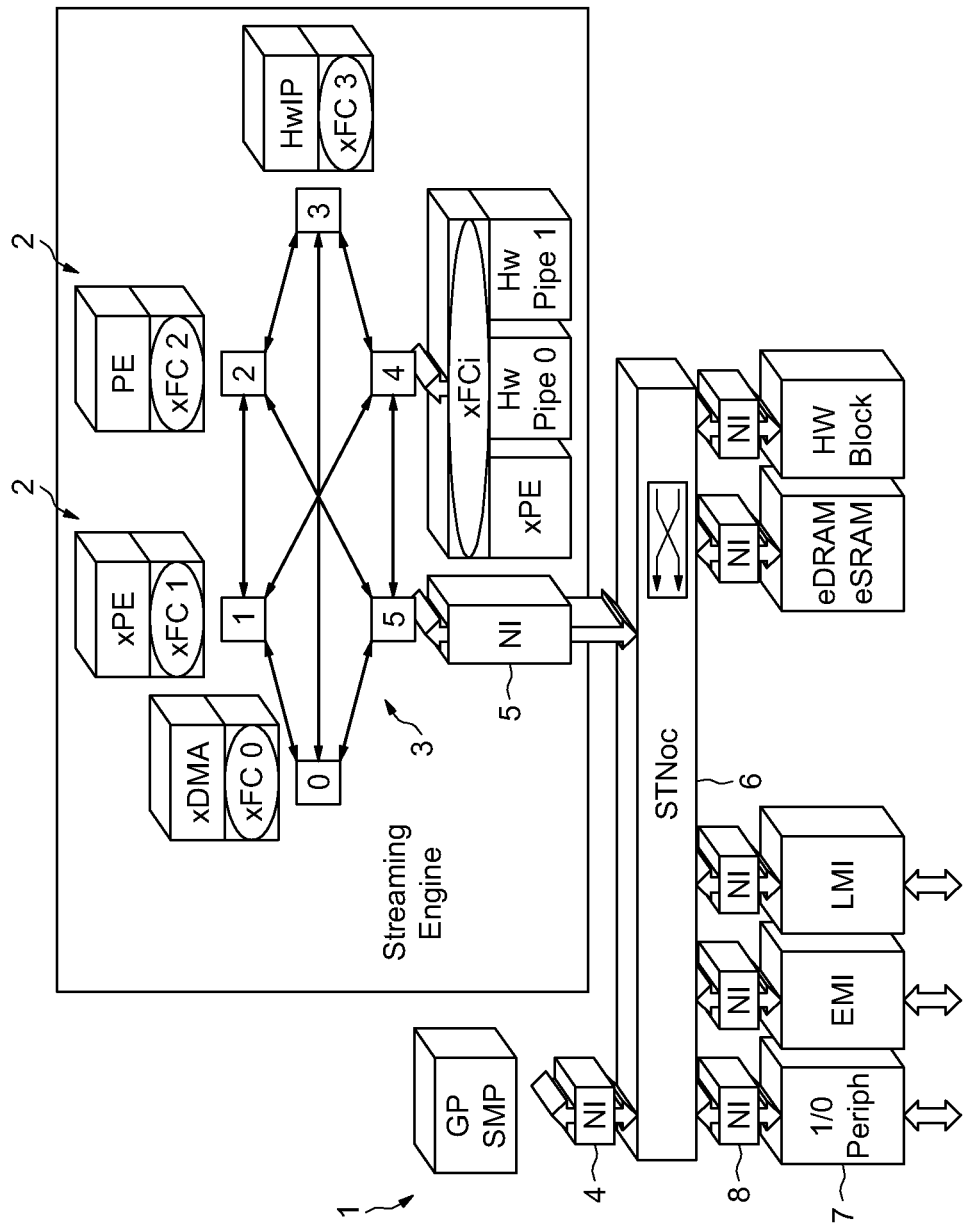
FIG. 1 illustrates the general architecture of the computing system architecture according to the present disclosure.

Reference is first made to FIG. 1, which illustrates schematically a computing system architecture.

This architecture is based on the use of a cluster 1 of symmetrical microprocessors in a symmetric multiprocessing configuration and a streaming engine comprising a set of processing devices 2 such as xPE made of programmable engines interconnected via an interconnection network 3 such as a network on-chip NoC, a bus assembly, . . . .

The cluster of processors 1 and the set of processing devices 2 communicate via network interfaces 4 and 5 with a Network on-Chip 6. As illustrated, a set of electronic components, such as I/O peripheral 7 and EMI and LMI blocks, is also connected via a corresponding network interface, such as network interface 8, with the network on-chip NoC 6.

Cluster 1 of processors is intended to support the most complex applications while offering good balance of performance scalability, cost, area and power consumption.

The processing devices 2 are relatively simple programmable processors or engines working in parallel.

On the contrary to the cluster of processors 1 which comprise a shared memory, the processing devices 2 comprise a distributed memory and aim at addressing the need of data flow control, message passing and at supporting highly computational intensive semi-regular tasks.

As previously indicated, interconnection network 3 is for example constituted by a NoC.

This NoC aims at providing interconnection paths between all the processing devices to allow flexible, efficient and cooperative parallel processing.

Each processing device 2 communicates with the NoC via a flow controller xFC0, xFC1, xFC2, . . . xFCi interfacing the processing device with the NoC.

Flow controller compounds are used to drive processing element requests to a relevant target. In other words, they are intended to receive either a load, store, push or a pop operation, either from the NoC side or from the processing device side. However, the flow controllers associated with each processing device are each intended to support data streaming control.

Figure 2:
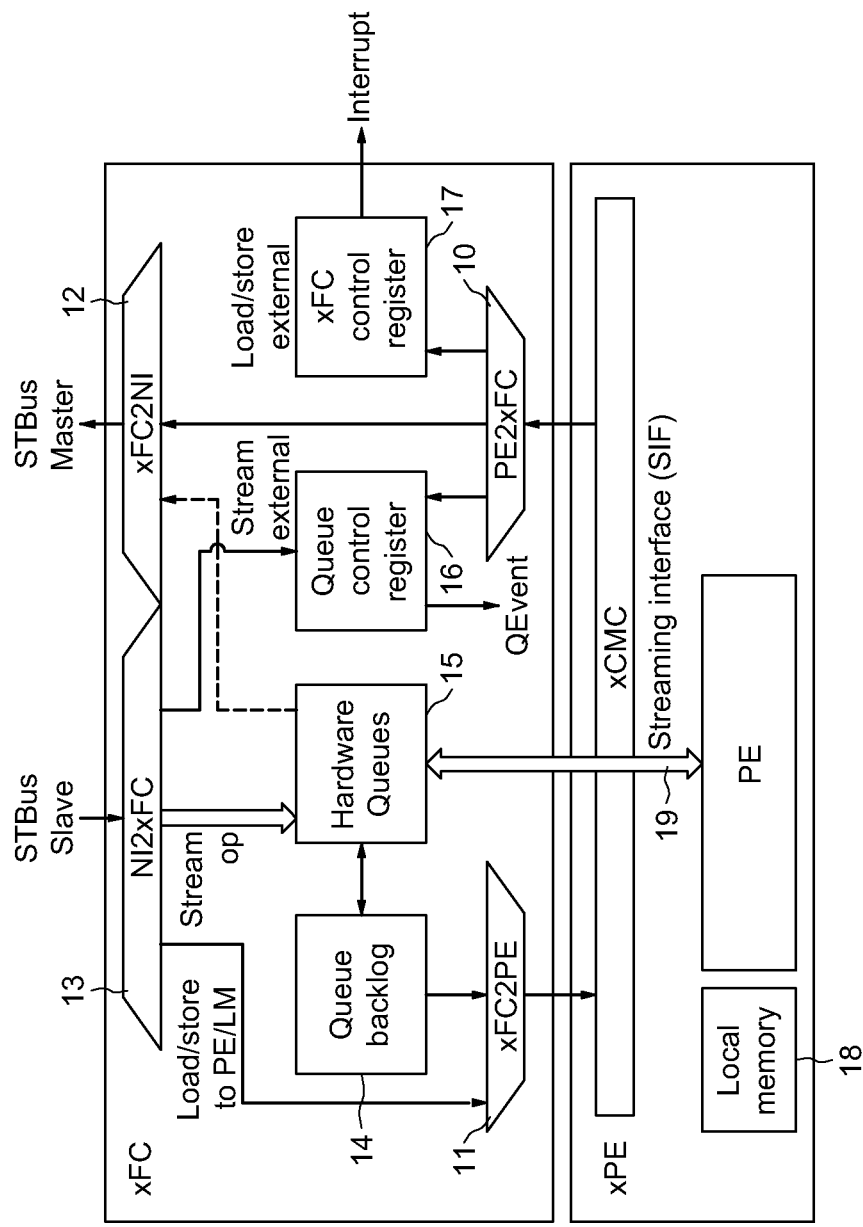
FIG. 2 illustrates the overall structure of the data stream flow controller of the architecture of FIG. 1.

Referring to FIG. 2, each data stream flow controller xFC comprises four interfaces, namely:

A first slave interface PE2xFC, denoted by reference 10, on the processing device side, which is used to manage load and store operations sent by a processing device. This interface supports operations both for xFC architecture resources and for external devices. Within the flow controller, addresses are checked to detect if a target is an xFC resource, for example a queue control register. If the address is not in the flow controller, the operation is sent to the network on-chip.

A second master interface xFC2PE, denoted by reference 11 which is provided on the processing element side. This interface is used to send load and store operations to the processing device. These load and store operations can be operations coming from the network NoC or operations initiated by a flow controller for backlog queue management.

A third interface xFC2NI, denoted by 12, provided on the network side, which is used to send load and store and push operations to the network.

A fourth interface NI2xFC, denoted by 13, provided on the network side to receive load and store and push operations from the network.

In addition, the flow controller comprises a streaming interface SIF FIG. 2 (19) which collects operations from the processing devices and interfacing a processing device and a corresponding hardware queue 15. This interface is independent from load and store interfaces. It should be noted that the stream protocol enables high performance point-to-point connections allowing high throughput and low latency. Such a stream interface allows the flow controller to manage several accesses initiated in parallel by the processing devices. Operations supported enables to send or retrieve elements from and to queues within block 15. However, some advanced stream operations can also be supported given application and system requirements and target supports.

It should be noted that, for example, this streaming interface provides a physical link between the stream initiator, namely a processing device, and the flow controller. This physical link may provide request paths, from the initiator to the flow controller, response paths, from the flow controller to the processing device, and retry paths from the flow controller to the processing device.

The stream protocol may thus support decoupled requests and response paths with an additional split retry interface.

As concerns the request paths, when the processing device sends a stream request to the flow controller xFC, this request is maintained high until the request is granted. This request comprises for example a stream opcode (OPC), a queue identifier (QID), a stream data (DATA), a stream index (IDX) and a stream thread identifier (THID).

The response path provides a response associated with the stream transaction received. It may comprise a response opcode (R_OPC), the value of which can be "FAIL", "SUCCESS" or "ERROR", and a response thread identifier (R_THID).

At last, the retry path is used to inform that a previous operation has failed, as concerns the response path, and can be rescheduled. It may comprise a queue resolution thread identifier (QRES_THID).

When a processing device issues a streaming operation to a flow controller xFC, a thread identifier is associated with this operation and is stored in the target queue.

If the operation can be served, namely if enough elements are present, a "SUCCESS" response is sent with elements. If not, a "FAIL" response is sent without elements. The stream operation needs to be re-executed. To avoid useless pooling when a queue condition is achieved, the flow controller sends back a response (the thread identifier) to indicate that a given thread can be started to execute a stalled stream operation.

In addition to the interfaces 10, 11, 12 and 13, each flow controller xFC comprise a set of modules, namely a queue backlog block 14, a hardware queue block 15, a queue control register block 16 and an xFC control register block 17.

The xFC control register block 17 comprises one register only and is programmable from outside in order to configure and control the whole flow controller.

Queue backlog block 14 and hardware queues block 15 constitute memory blocks for the flow controller.

Hardware queue block 15 constitutes the main memory for the flow controller. It is based on the use of a FIFO assembly providing the buffer capability for the flow controller.

In addition to this internal hardware buffer 15, the queue backlog block 14 is a memory space providing software queue extension beyond internal buffer capability.

At last, block 16 contains a set of programmable registers each associated with a corresponding FIFO to define queue parameters.

As previously indicated, the goal of the flow controller is essentially to implement a link of communication to enable efficient interconnection with processing devices providing a low latency and efficient interfaces with the network on-chip.

The object is also to enable firmware to build a wide range of communication libraries (streaming, MPI, components, . . . ) based on the configurable storing means 15, controlled by the queue control register block 16, providing internal buffer capability for the flow controller and on the use of the queue backlog block 14 providing memory extension for the FIFO 15.

In the example shown in FIG. 2, this additional memory block 14 is provided within the flow controller.

However, this additional memory can be setup within the local memory 18 of the corresponding processing device.

It should be noted that a queue support provided by the FIFO 15 enables efficient communication between a source target which sends elements, such as data or signals, and a destination target which collects them. This communication is thus based on queue features. Typically, a source target pushes elements and the destination consumer pops them. The set of registers 16 enables to define the queue parameters and then implicitly communication channels within the network on-chip 3.

Figure 3:
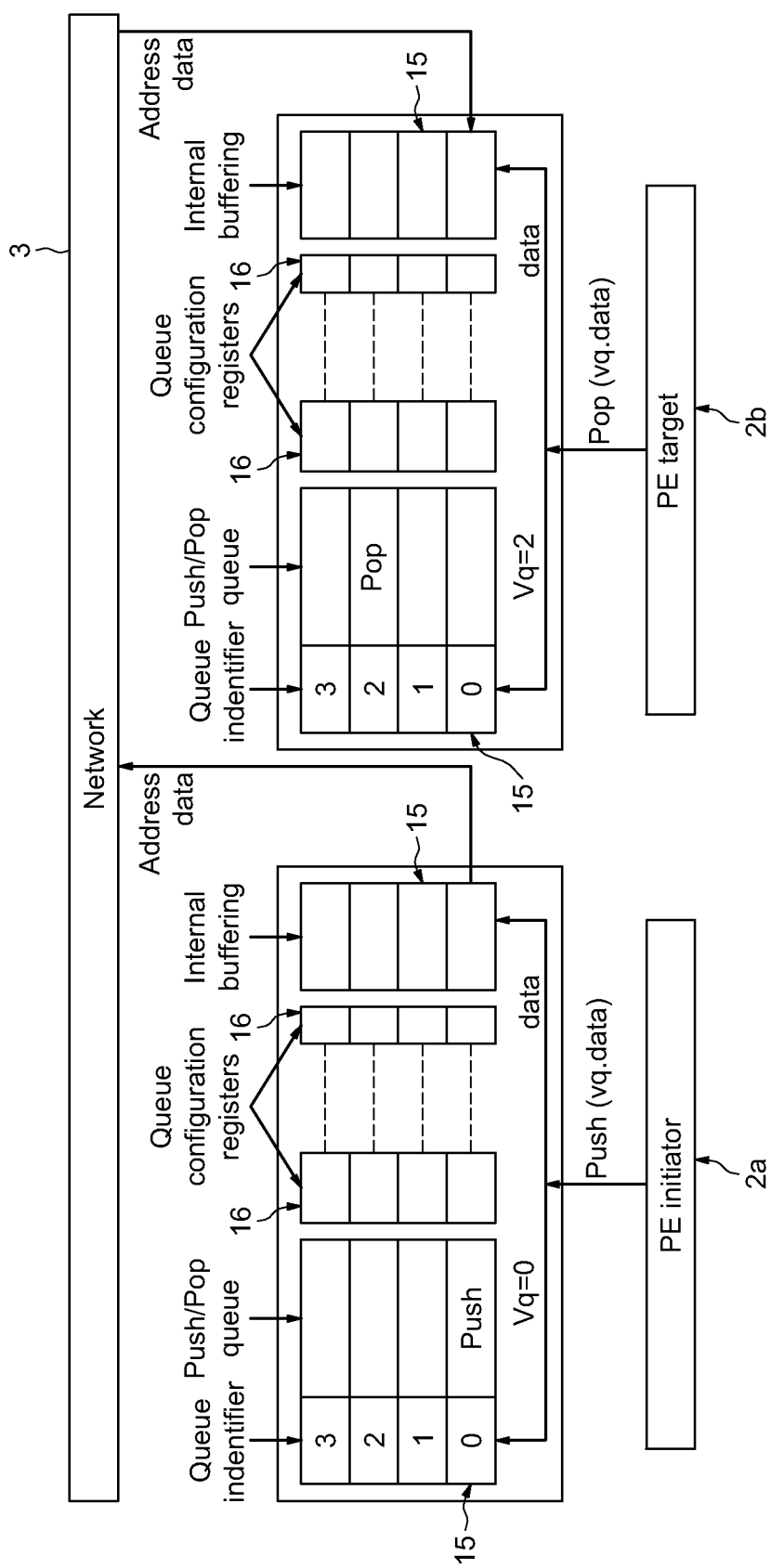
FIG. 3 is an example of point to point communication between two processing devices using the data stream flow controller.

Reference is now made to FIG. 3 illustrating a first example of point-to-point communication through queues.

According to the example shown in this figure, a processing device 2a initiates a transfer to a destination processing device 2b.

At the initiator side 2a, register 16 of the flow controller associated with the processing device 2a contains queue parameters intended to define communication channels within the network NoC 3. These parameters are intended to define the target of the push operation to enable NoC packet routing and queue destination, the packet transmission, in terms of size of transactions, bandwidth, . . . and the queue size for backlog space management.

It will be appreciated that, as previously indicated, this optional backlog structure is used when the processing device push operation cannot be managed in a flow controller, for example when the network on-chip is not able to send an element or when the push operation is defined to go directly to this backlog memory.

It should also be noted that this local memory reserved for each queue is software defined by the processing device.

The processing device, which pushes elements, sends a push opcode together with an identifier of the queue and with data. Queue configuration made by the register 16 enables data delivery to the targeted flow controller.

It will be also appreciated that the flow controller is also responsible to convert internal requests to the NoC protocol with all relevant routing information.

On the target side, the destination target is a queue, namely the FIFO 15 of the flow controller associated with the destination processing device. This destination FIFO is identified internally by way of the least significant bit (lsb) of the address received from the NoC, while the most significant bits (msb) address are used to route a transaction to the relevant flow controller.

In the flow controller, the received transaction is stored in the target buffer. It can be located in the internal flow controller buffer 15 or in the queue backlog block 14.

It will be appreciated that the destination processing device is able to check the content of the queue by reading the corresponding control register 16, for example to pull queues to check whether it contains elements to be processed.

A processing device which wants to take an element from the FIFO or from the backlog memory sends a pop instruction from the streaming interface with the associated queue identifier to get data therefrom.

It should be noted that the flow controller offers a capability for a processing device to send a stream of data interleaved with control information. It enables, through a control register 16, to:
setup implicit synchronization with a receiver;
have implicit transfer to the NoC since, once a queue is defined, transfer is transparent, source target pushing data;
provide software queue size defined by a user;
maximize usage of NoC features such as a virtual channel usage, burst generation, bandwidth limitation, . . . ;
define and control transfer bandwidth from a source target to a destination target.

Figure 4:
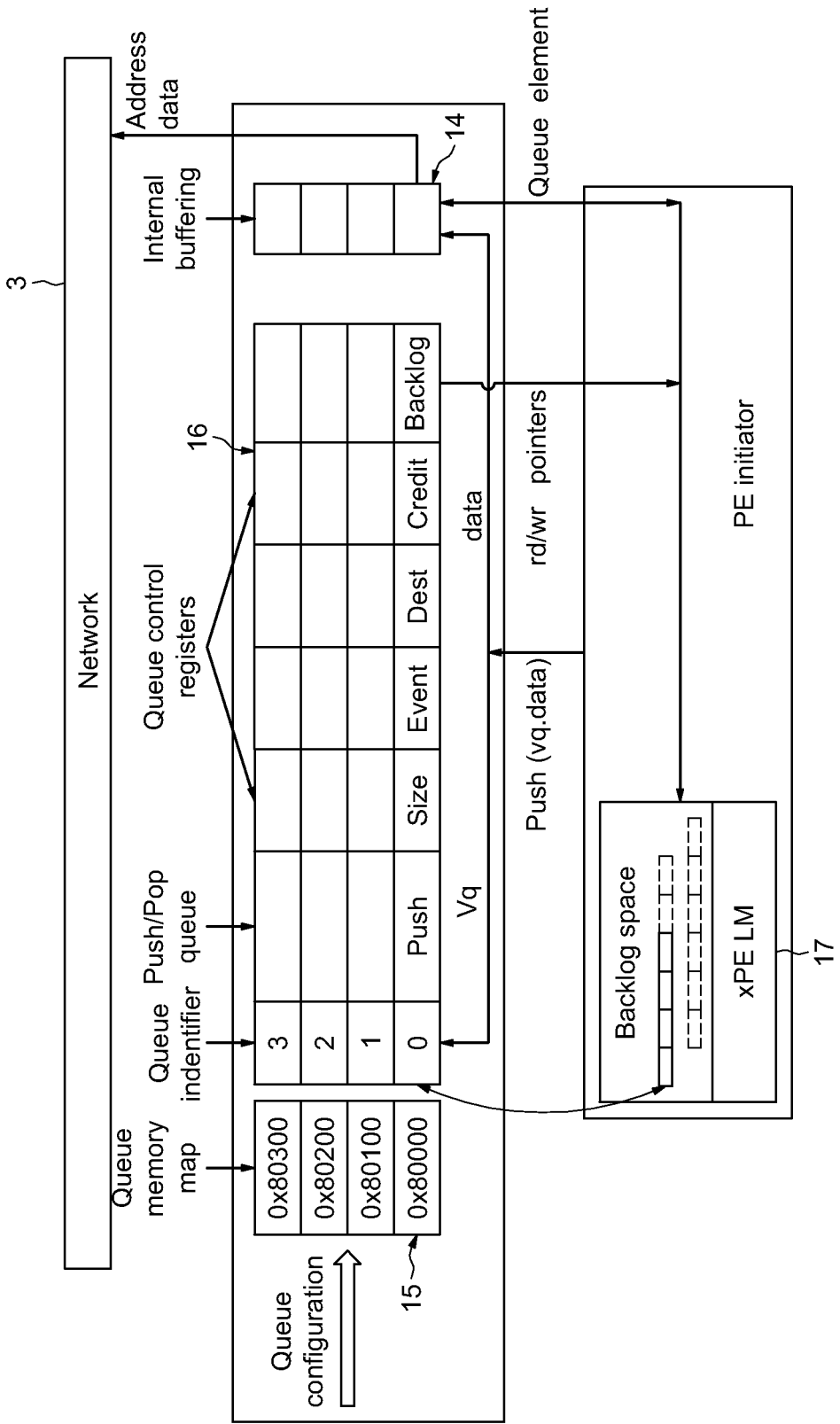
FIG. 4 illustrates a push queue block diagram.

A push queue mechanism will now be described with reference to FIG. 4.

When a source processing device 2a initiates a request, a communication channel from this processing device to the destination processing device is done through a queue setup.

As concerns push operations, such operations are used by the source processing device to send elements to a FIFO. It is done by the processing device using the streaming interface. The flow controller thus receives a queue identifier and an element to store.

When the flow controller receives a push operation, this operation is driven to a FIFO defined by the queue identifier sent with the pushed element. As previously indicated, this internal buffer can be software extended using a local memory shared between the flow controller and the processing device. As a matter of fact, when this buffer is full, the elements pushed can be sent to the backlog block 14 for temporary storage.

The last phase of the push operation corresponds to the transfer of the element within the FIFO to the network on-chip. It will be appreciated that this operation is hardware managed but defined by the control register 16.

For this transfer from the FIFO to the NoC, each queue has control registers used to specify data transfer and ensure packet delivery over the network. As disclosed later, essentially, a first queue parameter xFC_VQ_TRANS_CFG defines transfer features. It contains, for example, information concerning the quantity of bits to be transmitted over the NoC and eviction rules to guaranty that no element remains in the local queue forever.

For example, as disclosed later, register 16 contains a second parameter xFC_VQ_REMOTE_ADD used to define the final destination.

Additional registers can also be defined to guaranty that the number of elements sent to the Network on-Chip can be accepted by the destination processing device. For example, a push protocol can be implemented and activated.

Figure 5:
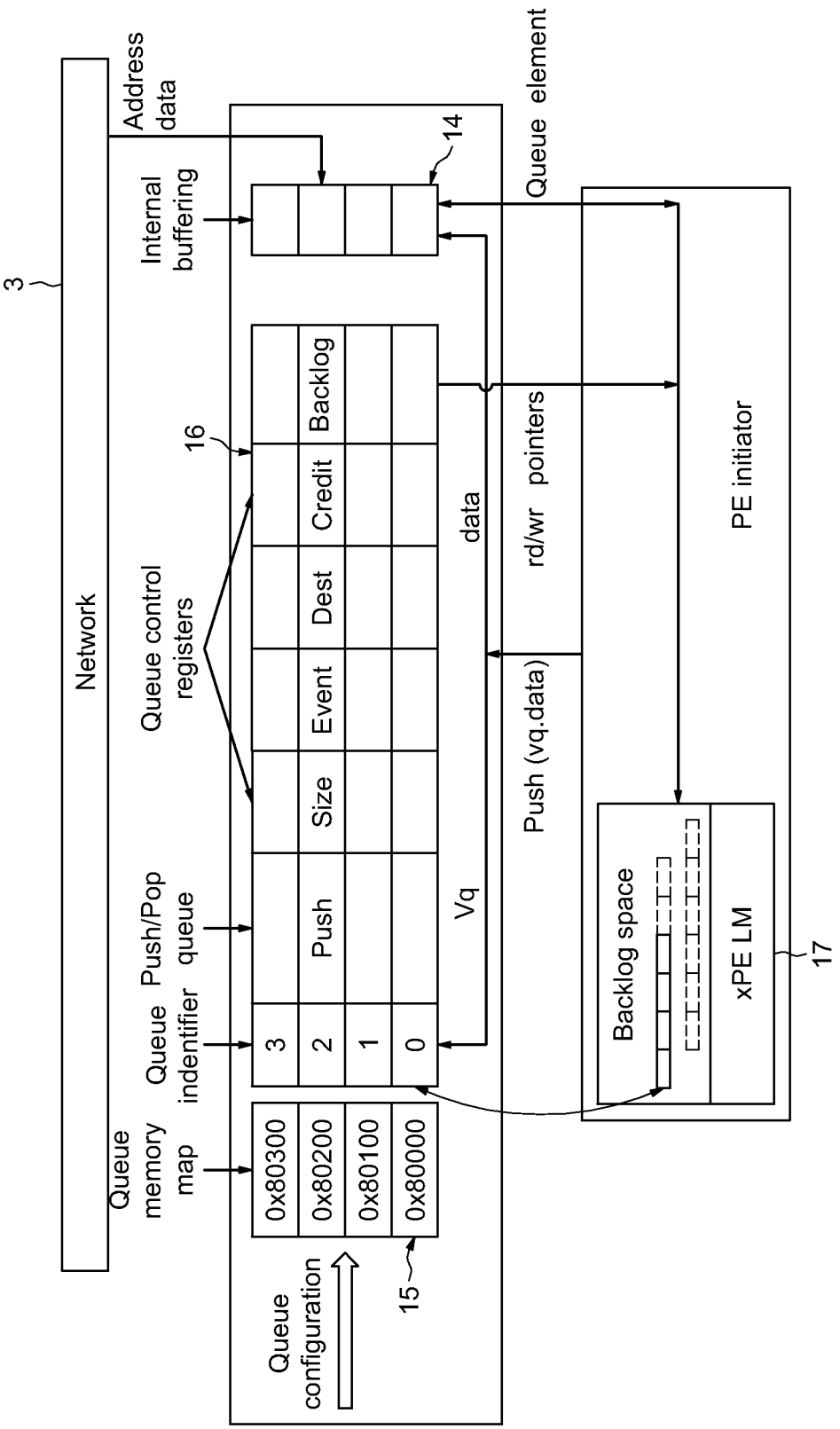
FIG. 5 illustrates a pop queue block diagram.

Referring to FIG. 5, a pop queue mechanism will now be described.

As concerns the pop queue mechanism, the flow controllers offer the capability for processing devices to have implicit synchronization through a queue mechanism. It enables, through a control register, to setup implicit synchronization with a sender processing device, to target processing devices to get elements through a stream operation and to obtain control elements interleaved with a signal.

When a processing device wants to pop elements, initially, software must setup a communication channel from the initiator processing device to the destination processing device through a queue setup.

Pop operations are issued by a processing device to get elements from a queue. They are associated with a queue identifier specifying FIFO from which elements are taken.

When a flow controller receives a pop operation, queues, namely the FIFO, are checked. Each queue has an internal buffer used as a temporary storage. If the queue is empty, the flow controller sends back a failed response. Operation has to be reexecuted.

It should be appreciated that pop queues are filled by elements coming from the NoC. Operations transmitted over the NoC are a write posting store, such that the flow controller does not have to send back a response.

Depending on internal conditions, elements received can be stored in the internal queue buffer or put in the backlog block 14.

Pop queue also receives a synchronization operation. In such a case, the flow controller sends back a response when all operations previously received are handled, namely effectively stored in a FIFO.

It will also be appreciated that queue control register block 16 is memory mapped and accessible for queue configuration, bearing in mind that each queue has also an identifier which is used for a streaming operation to target one queue.

In view of the foregoing, the data stream flow controller supports differing streaming operations through a dedicated streaming interface.

For example, so-called push, pushSig, pop, and syncQueue operations can be supported.

A "push" operation is used to store a new element in a queue. It comprises two parameters, namely a queue identifier and an element to push. This operation is blocked if the queue is full.

The "pushSig" operation is only supported for push queues. It is used to store a new element in a queue. This push operation has two parameters, namely a queue identifier and a signal to push, namely a data. This operation is blocked if the queue is full.

The "pop" operation is only supported for pop queues. It is used to fetch the head of the queue. Pop operation has two parameters, namely a queue identifier and an element, namely a data, which in the head of the queue.

This operation is blocked if the queue is empty. Nevertheless, the flow controller provides a "FAIL" response instead of a blocking operation within the flow controller.

The "peek" operation is only supported for pop queues. It is used to read one element of the queue. Peek operation integrates an extra parameter regarding pop operations called index. Index corresponds to element to read. This element is not removed from the queue.

This operation is blocked if the number of elements in the queue is lower than index+1. Nevertheless, the flow controller provides a "FAIL" response instead of a blocking operation within the flow controller.

One exception happens when a signal is present in the queue and if signal index (position in the queue) is lower than the peek index. In this case whatever the number of element, a peek "SUCCESS" response is provided.

At last, the "syncQueue" operation is only supported for push queues. It forces the queue to push out its content. The operation is blocked until all elements are received by a target. It should be noted that this syncQueue operation provides a way to guarantee that all the sent elements have been actually received at the destination target.

The mechanism implemented for any processing device to push an element to a remote queue (pop operation) is done by way of a memory map addressing. Initiator which wants to send an element to a remote queue can either send a push or a store operation, the store operation being used if the push operation is not supported. For this operation, the initiator sends information permitting to determine the destination target and the destination queue, as well as information indicating if the transmitted data is a signal or a data.

Figure 6:
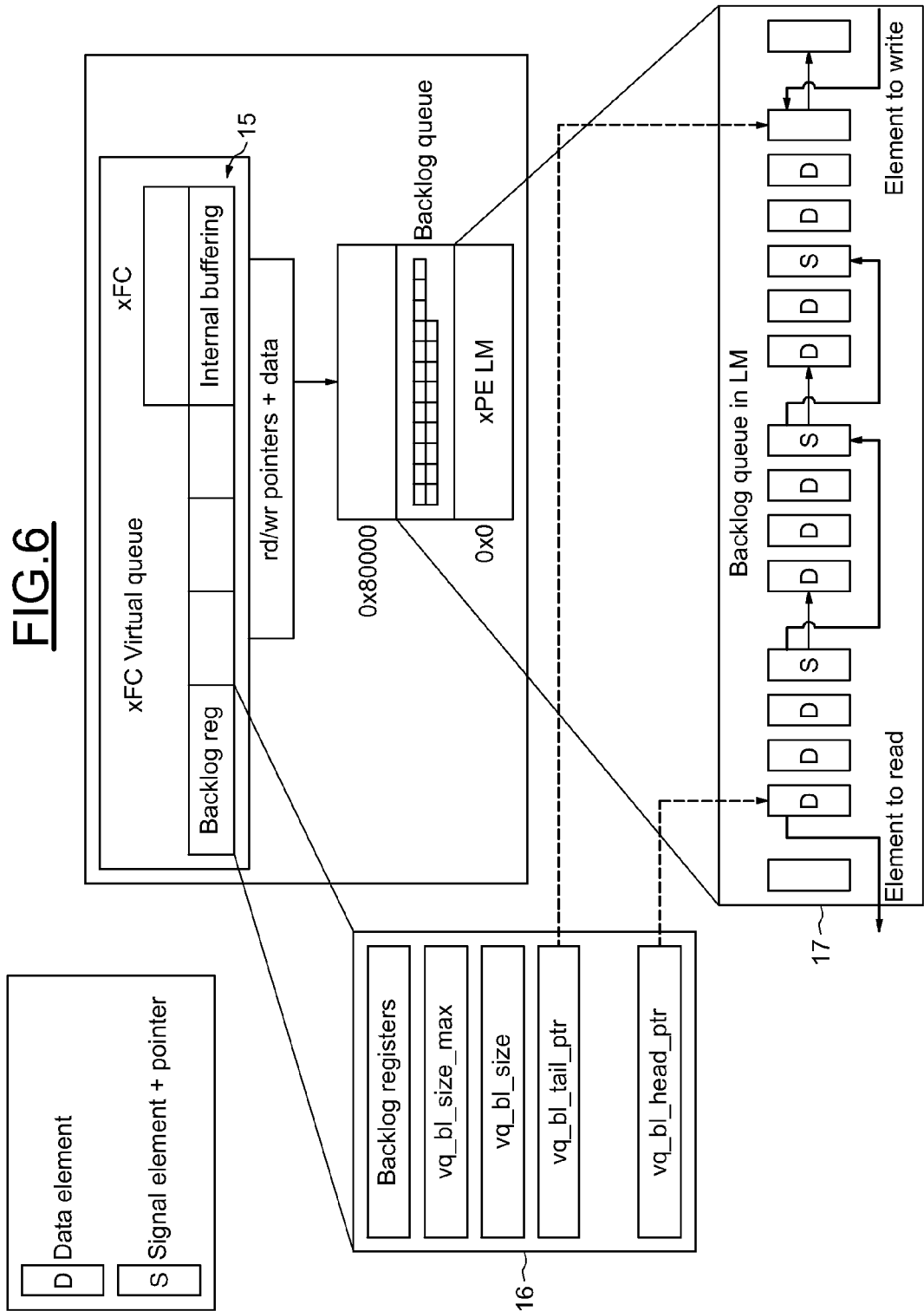
FIG. 6 illustrates an example of an additional memory for providing memory extension for the storing means.

Referring further to FIG. 6, which illustrates management of the additional memory, and which illustrates an embodiment in which this additional memory is located in the local memory of the processing devices, as previously indicated, in addition to internal hardware buffer for queue element storage, each FIFO is associated with an additional memory.

This memory space is used for software queue extension beyond internal buffer capability.

In the illustrated example, this backlog memory location is a memory space reserved in the processing device local storage. However, it will be appreciated that any other memory regions located either in the flow controller or in the processing element or, generally speaking, in the computing system architecture can also be used instead.

This additional memory is used when an element of this architecture, namely a processing device for a pop queue mechanism or the network on-chip for a push queue operation, is not able to handle enough elements.

The set of control registers within block 16 is used to setup and control storage of data within this additional memory. However, it should be noted that the flow controller can handle either data or signals, namely information transmitted within a stream which is not data. Thus, in the additional memory 14, signals and data are merged in the backlog queue.

As further explained below, queue control register 16 contains a backlog register 16a for controlling backlog. In particular, this backlog register 16a contains xFC_VQ_BL_LOCAL_ADD and xFC_VQ_BL_SIZE_MAX registers used to define address and maximum size of the backlog storage queue.

In addition, backlog register 16a contains xFC_VQ_BL_PTR and xFC_VQ_BL_TAIL_PTR used to define read and write pointers for head and tail of the queue to store and fetch elements from the additional memory 14.

Furthermore, an xFC_VQ_BL_CUR_SIZE register defines the number of elements in the backlog memory and xFC_VQ_CONTROL register enables backlog activation. It should be noted that backlog memory is filled when internal queue buffering is full or when tail of the queue already lies in the backlog space or when internal buffer should not be used, which is control by setting a xFC_VQ_CONTROL register.

As illustrated in FIG. 6, when a signal is to be stored in the additional memory element, this element is linked by a pointer to the next memory element in which a signal is to be stored.

When a queue element has to be stored in the processing device local memory, a queue backlog control register is modified. In addition, pointers are modified accordingly. In particular, during a pop operation, when the FIFO 15 is full, elements received from the NoC are stored in the backlog space at an address defined by the pointer xFC_VQ_BL_TAIL_POINTER. This pointer is incremented when a new element is stored in the backlog. If there are elements in the backlog memory, internal buffering is filled fetching elements from there When an element is fetched from the backlog memory, the pointer xFC_VQ_BL_HEAD_PTR is incremented accordingly.

As concerns a push operation, when the internal buffer is full, elements sent by the processing device is stored in the backlog space at an address defined by the pointer xFC_VQ_BL_TAIL_PTR. This pointer is incremented when a new element is stored in the backlog memory. When elements are present in the backlog memory, internal buffering is filled fletching elements from there and the pointer xFC_VQ_BL_HEAD_PTR is decremented accordingly.

At last, as concerns discrimination between signal and data, as previously indicated, when a signal is present in a backlog memory element, this element is linked to the next backlog memory element in which a signal is stored.

To determine whether a data or a signal is stored in the backlog memory, the address at which an element is read from the backlog memory is compared with the address of a register indicating location of the first signal in the backlog memory. It can thus be determined whether a fetched element is a signal if the read address corresponds to that of the first signal until the address corresponding to the last signal is reached.

Besides, mechanism implemented for any processing device to push elements into a remote FIFO is done by way of a memory map addressing. A processing device which wants to send elements to a remote queue can send either a push operation or a store operation if the push operation is not supported. The initiator processing device, namely the flow controller sends an address accordingly to the target, this address being used both by the Network on-Chip and by the flow controller to route the operation to the relevant destination. The address sent over the network is for example split in different field, for example in four parts.

For example, the first most significant bit is used to define the target component, namely the destination flow controller, the second field specifies if the operation targets a pop queue, the third field indicates if the sent element is a signal or a data and the last field is used to define a queue identifier within the target component.

Figure 7:
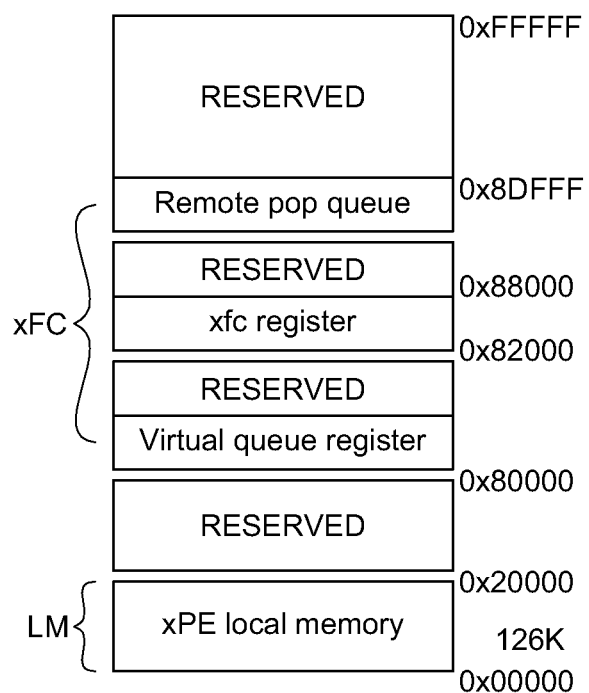
FIG. 7 illustrates the memory mapping of the configurable storing means and of the programmable control means.

Referring now to FIG. 7, hardware queue block 15 and an xFC control register block 17, as well as queue backlog block 14 and local memory 18 of the processing device may be embedded within a same system memory map.

As illustrated in this FIG. 7, a first memory region LM is dedicated for the processing device local memory.

A second memory region xFC is dedicated for the storage of the control registers 16 and 17. An additional storage region "remote pop queue" is provided to store the xFC_VQ_REMOTE_ADD register to indicate the address of a destination FIFO.

In view of the foregoing, the flow controller provides a set of control registers 17 used to configure and control the flow controller, as well as a set of queue control register 16 associated with each FIFO to specify data transfer channels within the NoC and to ensure that packets are duly transmitted.

FIG. 8 illustrates some examples of registers used to control data transfer between data processing devices and the interconnection network.

For example, the xFC_VQ_STATUS register contains the status of a virtual queue and is also used for backlog setting, credit protocol activation, . . . . This register is a read-only register and is updated through the xFC_VQ_CONTROL register or by internal mechanism.

The xFC_VQ_CONTROL register enables individual queue control and enables to set or reset queues, to set backlog and to reset signal.

The xFC_VQ_SIZE register provides the number of elements present in a queue. The value of this register is a computation of elements within the backlog memory and of elements present in the internal FIFO.

The xFC_VQ_ERROR register indicates the status of events. It contains both queue error and signal error fields set by internal queue conditions.

The xFC_VQ_BL_LOCAL_ADD register defines the local memory address of the queue in the processing device. For example, it contains a first field indicating the base address for the queue extension in local memory and which is a constant value. This address is used for all pointers associated with the backlog extension. It also contains a second field which is used to define offset address in local memory where data will be stored.

The xFC_VQ_BL_CUR_SIZE register provides information concerning the current size of the queue and defines the number of elements present in the backlog memory at a given time.

The xFC_VQ_BL_SIZE_MAX register is used to provide the size reserved for the queue in the backlog memory. It thus provides the size in bytes reserved for the queue. The value stored in this register cannot exceed the local memory size.

The xFC_VQ_BL_TAIL_PTR register contains the address of the queue in the local memory and contains a field used to define a pointer to the tail queue. As indicated above, this register is implemented when a new element of the queue is written in backlog by an increment corresponding to the size of the stored element.

The xFC_VQ_BL_HEAD_PTR register contains the address of the queue in the local memory and contains the field defining the offset of the head queue. This register is used to get data for pop operations and to send data to the NoC in case of push operations. This register is incremented when a new element of the queue is popped from the local memory by an increment corresponding to the size of the popped element.

At last, it should be noted that the xFC_VQ_CRED_TRIG; xFC_VQ_CRED_CNTADD and xFC_VQ_CRED_CNT registers are used to provide an end-to-end queue credit protocol.

Referring to FIG. 8, a push credit protocol is an end-to-end protocol implemented between an initiator processing device and a target processing device. It is used to ensure the system performance and to avoid system deadlocks. As a matter of fact, streaming features offered by queues does not provide a size limitation for element transfers. Hence, an initiator may send more elements than the target can manage. This would lead to a stale condition in the communication network and potentially to a system deadlock.

The credit protocol guarantees that all elements sent by a processor device can be accepted by a destination target. In addition, it does not rely on communication link and requires minimum resources distributed among initiators and targets devices.

Figure 9:
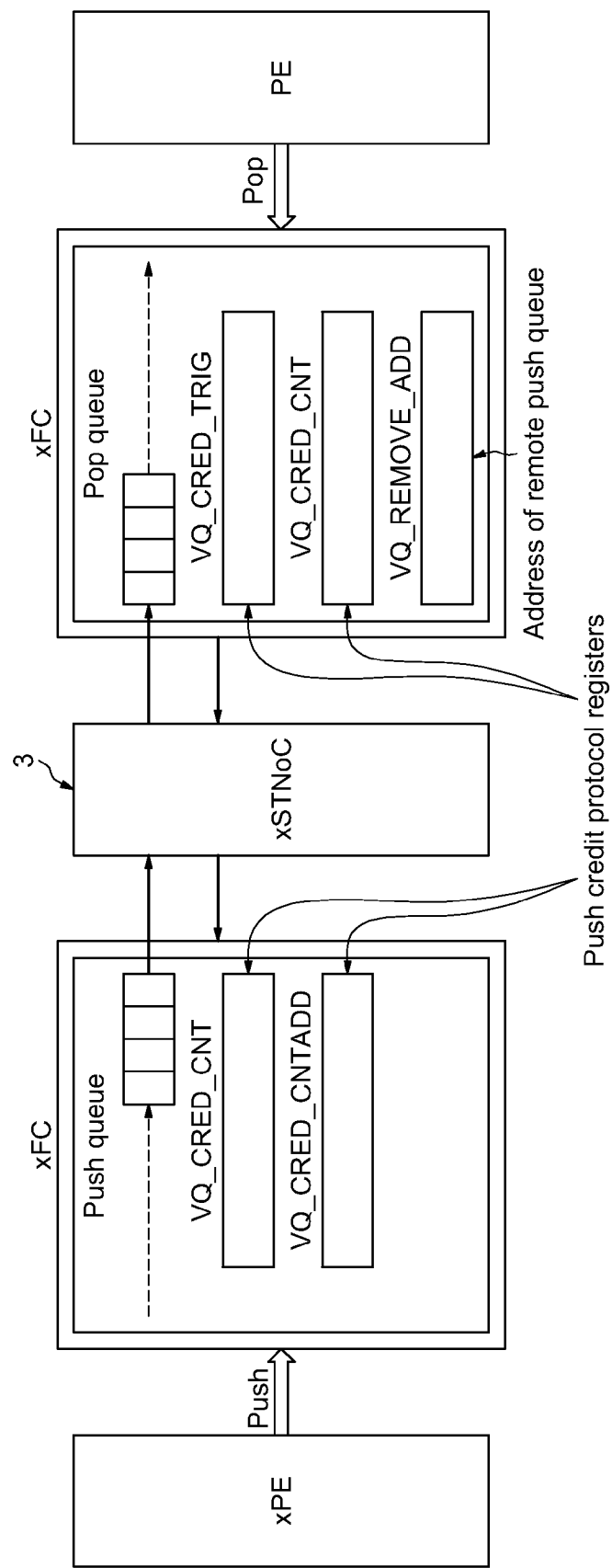
FIG. 9 illustrates the end-to-end queue credit protocol.

As illustrated on FIG. 9, this credit protocol is based on the use of a first credit counter register VQ_CRED_CNT which corresponds to the number of elements that can be sent to the destination target and corresponds to the size available in this target. It should be noted that this register is used differently given push queue context or pop queue context. For push queue operations, this register provides the number of elements which can be sent to the target. It is decremented when an element is sent and incremented with a remote pop queue credit sent. In particular, it is written with the value stored in the xFC_VQ_CRED_CNTADD register.

For pop queue, this VQ_CRED_CNT register is a counter of elements popped by the processing device. It is incremented when an element is taken and decremented of a value corresponding to the credit sent to the initiator target.

Thus, at the destination side, the flow controller comprises a second VQ_CRED_CNT representing the number of elements that have been forwarded.

In addition, VQ_CRED_CNTADD and VQ_REMOTE_ADD registers are used as an alias of the xFC_VQ_CRED_CNT and are used to add current credit count with credit stored in this register. They are thus used to increment the credit counter.

Thus, at the target side, the counter xFC_VQ_CRED_CNT contains the number of elements that have been forwarded to the destination target. This counter value is sent to the initiator processing device as a credit and corresponds to the number of elements that the initiator can send, when this counter reaches a trigger value stored in the xFC_VQ_CRED_TRIG register.

As a matter of fact, when the xFC_VQ_CRED_CNT is greater than xFC_VQ_CRED_TRIG, the flow controller informs the remote push queue that it is able to accept a new set of elements. This is done by writing remote control register xFC_VQ_CRED_CNTADD. In this context, xFC_VQ_REMOTE_ADD register is used to define the mapping of the initiator queue. Thus, by comparison, when it is determined that the credit counter is greater than the threshold value xFC_VQ_CRED_TRIG, further elements can be forwarded to destination.

Figure 10:
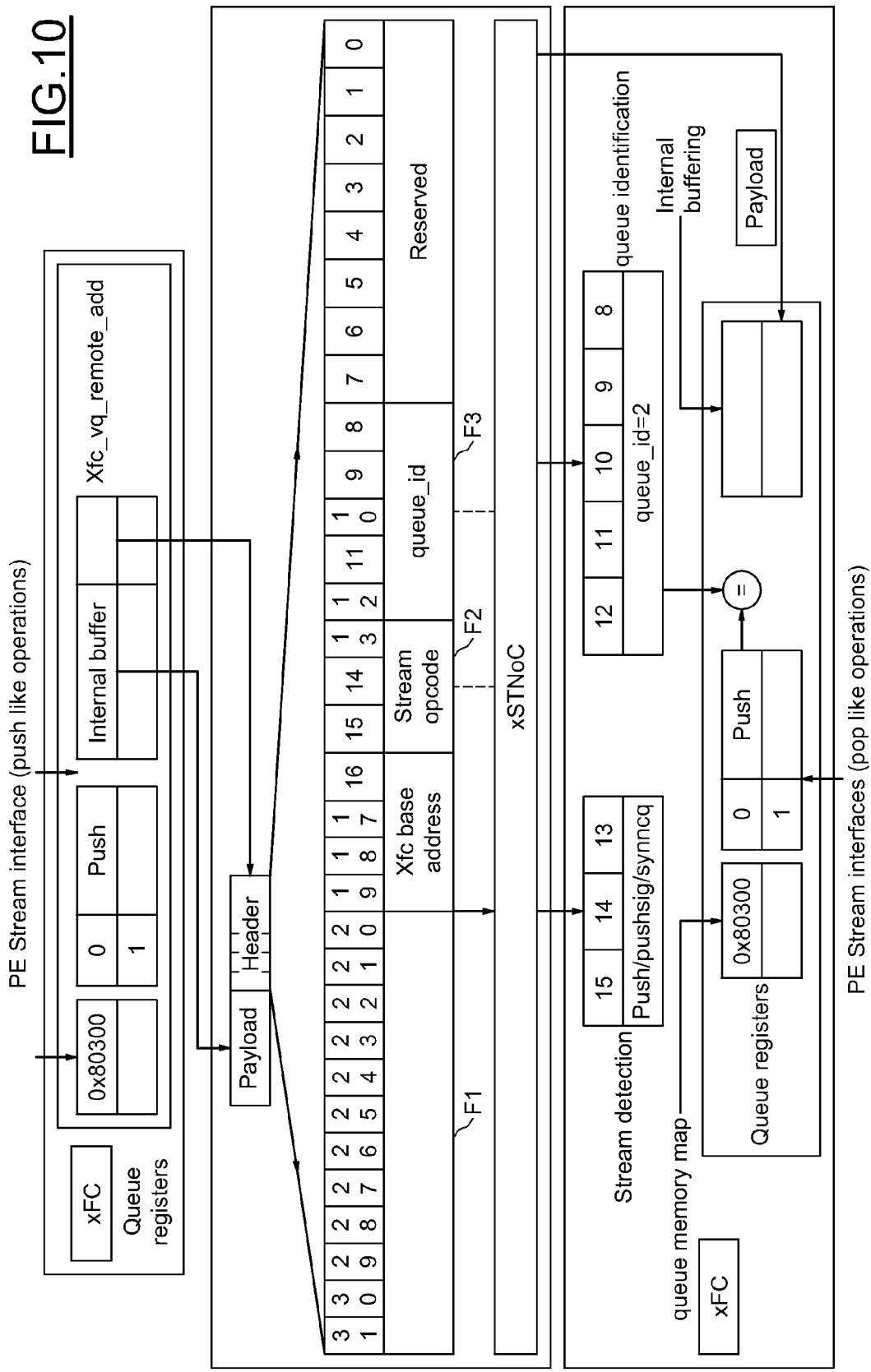
FIG. 10 illustrates a path of data between an initiator and a destination flow controller.

As previously indicated, the mechanism implemented for a processing device to push an element to a remote queue is done by way of a memory map addressing. Referring to FIG. 10, an initiator which wants to send an element to a remote queue can either sends a push operation or a store operation, if the push operation is not supported.

Data are sent over the interconnect network in the form of data packets having a payload containing data to be transmitted and a header used to control routing of data over the network up to the destination target.

As illustrated on FIG. 10, the header comprises a set of fields to a target remote pop queue. In particular, it comprises a first field F1 used to define the target component, namely the xFC address, a second field F2 containing the stream opcode used to define the operation, a fourth field F3 intended to target the destination queue.

The thus transmitted information are decoded by the destination flow controller where the stream opcode is decoded and the queue identification is used for internal buffering of data transmitted by the payload.

This mechanism enables any system component to send elements to a remote pop queue.

Figure 11:
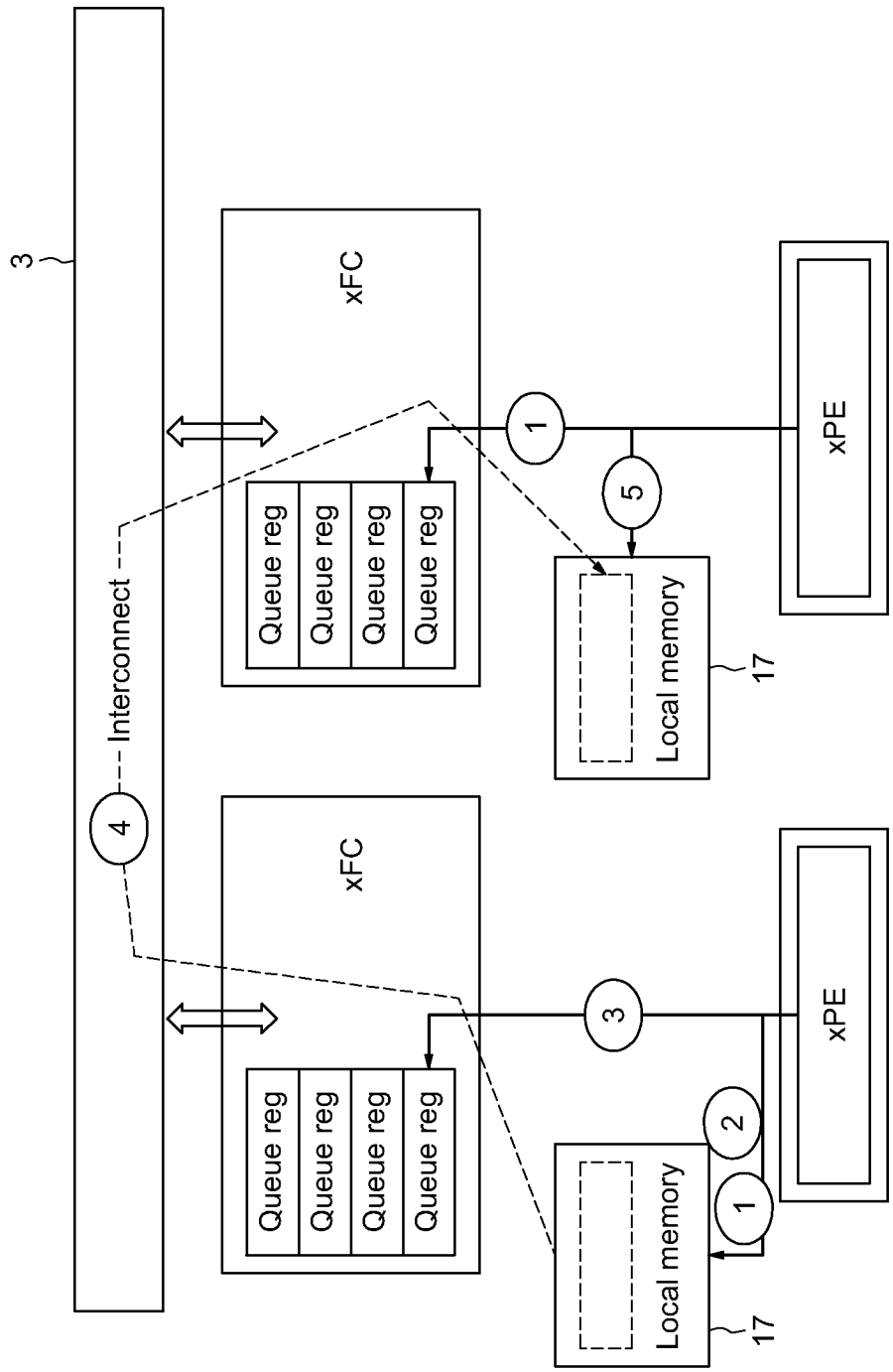
FIG. 11 illustrates the end-to-end remote DMA principle.

Focusing now on FIG. 11, xFC FIFO can be used to carry out a direct memory access (DMA). In other words, the flow controller FIFO enables to transfer elements without useless intermediate data buffering. Remote DMA principle is to allocate a buffer in a local memory and to use this memory space either to file it for a sender processing or to get elements from it, for a receiver processing.

Remote DMA principle first involves an initialization step starting by a buffer allocation in the memory. This initialization can be done either by a local process or by a remote one. This queue initialization consists in writing a queue control register to set up a queue given operation required.

For a receiver process, the queue is configured as a pop queue with an extension in the local memory LM, with some additional parameters.

For a sender process, the queue is configured as a push queue with an extension in the local memory.

It should be appreciated that if initialization is done before that the entire buffer is written to the memory the queue may not be fully configured. Typically, elements must not be sent to destination since they have not been written to memory. This is done by writing all control registers, apart from xFC_VQ_SIZE, which indicates the number of elements in the queue.

After the initialization step, buffer transfer is carried out. When the sender process has been completed, namely when all data are stored in the local memory, data transfer to remote pop queues can be activated. This is done either by host or local process. Once activated, the push queue automatically fetches elements from the local memory, using a queue register pointer to local memory, and generates a configurable burst to the destination target.

At the receiver side, elements received are stored in the local memory at an address defined by the queue control register.

As concerns the buffer transfer completion, the sender and receiver get information of the transfer status using the xFC control register xFC_VQ_SIZE.

Although preferred embodiments of the method and apparatus have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A data stream flow-controller for controlling a transfer of data between a data processing device and a network on chip (NoC) supporting a plurality of interconnection paths to destinations at other data processing devices, comprising:

interfaces configured to interface the flow-controller on the network on chip side and on the data processing device side, a configurable memory configured to buffer data in a plurality of first-in-first-out (FIFO) queues including a plurality of individual receive data queues and a plurality of individual transmit data queues;

an additional memory configurable to provide for a software queue extension beyond the configurable memory when one or more of the FIFO queues is full and backlogged buffer data is rep sent;

a plurality of queue registers each associated with a corresponding one of the plurality of FIFO queues and configured to store identification data for the interconnection paths and addressing data for identifying where backlogged buffer data for the FIFO queues is being stored in said additional memory.

2. The data flow controller according to claim 1, wherein said queue register for each FIFO queue is configured to store queue parameters.

3. The data flow controller according to claim 1, wherein said additional memory is a memory space reserved in a local memory of the data processing device.

4. The data flow controller according to claim 3, further comprising a dedicated register configured to control storage within the additional memory.

5. The data flow controller according to claim 1, further configured for controlling a transfer of data and a transfer of signals, wherein the data and the signals are merged in the additional memory.

6. The data flow controller according to claim 5, wherein each memory element of said additional memory in which the signal is stored is linked by a pointer to a next memory element in which a signal is stored.

7. The data flow controller according to claim 5, wherein a first register is for storing an address of the first signal and a second register is for storing an address of the last signal and further comprising a comparison device for comparing a read address with the address in the first register to detect if a fetched element from the additional memory is a signal.

8. The data flow controller according to claim 1, further comprising means to transfer data according to a credit protocol.

9. The data flow controller according to claim 1, further comprising a first credit counter register configured to store a first value, that is received from a target flow controller on the interconnect network, which represents a number of pushed data elements that can be sent to said target flow controller, wherein said first value is decremented for each pushed data element sent to said target flow controller and incremented by a second value representing data elements popped from said target flow controller.

10. The data flow controller according to claim 1, further comprising a second credit counter register configured to store a second value which represents a number of data elements that can be received from a source flow controller, wherein said second value is incremented with each data element popped by the flow controller from said another FIFO queue and decremented by a first value that has been sent to the source flow controller representing a number of data elements that can be sent by the source flow controller.

11. The data flow controller according to claim 1, further comprising at least one global control register to control and configure said data flow controller.

12. The data flow controller according to claim 1, wherein said interfaces comprise:

a first slave interface on a processing device side which manages load and store operations sent by a processing device, a second master interface on a processing element side which sends load and store operations to the processing device, a third interface on the network side to send load and store and push operations to the network;

a fourth interface on the network side to receive load and store and push operations from the network; and a fifth interface a streaming interface to connect a processing element to hardware FIFO's supporting a set of stream operations.

13. The data flow controller according to claim 1, further configured to control storage in said individual transmit data queues in response to a data processing device push operation, wherein said processing device push operation comprises a first parameter identifying one of said FIFO queues and a second parameter comprising data to be pushed.

14. The data flow controller according to claim 13, wherein said data to be pushed comprises a signal to be pushed.

15. The data flow controller according to claim 1, further configured to control extraction from said individual receive data queues in response to a data processing device pop operation, wherein said processing device pop operation comprises a first parameter identifying one of said FIFO queues and a second parameter comprising data to be popped.

16. A data stream flow-controller for controlling a transfer of data between a data processing device and a network on chip (NoC) including a plurality of interconnection paths to destinations at other processing devices, comprising:

interfaces configured to interface the flow-controller on the interconnection network side and on the data processing device side, a configurable memory configured to buffer data in a plurality of individual first-in-first-out (FIFO) transmit data queues connected to said interface on the interconnection network side, each individual transmit data queue within the plurality of FIFO transmit data queues associated with a different unique destination on said interconnection network;

an additional memory configurable to provide for a software queue extension beyond the configurable memory when one or more of the FIFO transmit data queues is full and backlogged push data is present; and a programmable controller configured to control storage in said configurable memory and additional memory by defining queue parameters associating each FIFO transmit data queue with a unique destination for buffering push data received from said data processing device and intended for transmit over the interconnection network to said unique destination and addressing data identifying where the backlogged push data for the FIFO transmit data queue is being stored in the additional memory.

17. The data stream flow controller according to claim 16, wherein said push data comprises a first parameter uniquely identifying one of said plurality of FIFO transmit data queues and a second parameter comprising data to be pushed.

18. The data stream flow controller according to claim 17, wherein said push data comprises a signal to be pushed.

19. A data stream flow-controller for controlling a transfer of data between a data processing device and a network on chip (NoC) including a plurality of interconnection paths to sources at other processing devices, comprising:

interfaces configured to interface the flow-controller on the interconnection network side and on the data processing device side, a configurable memory configured to buffer data in a plurality of individual first-in-first-out (FIFO) receive data queues connected to said interface on the interconnection network side, each individual receive data queue within the plurality of FIFO receive data queues associated with a different unique source on said interconnection network;

an additional memory configurable to provide for a software queue extension beyond the configurable memory when one or more of the FIFO receive data queues is full and backlogged pop data is present; and a programmable controller configured to control storage in said configurable memory and additional memory by defining queue parameters associating each FIFO receive data queue with a unique source for buffering pop data received from said unique source over said interconnection network side and intended for said data processing device and addressing data identifying where the backlogged pop data for the FIFO receive data queue is being stored in the additional memory.

20. The data stream flow controller according to claim 19, wherein said pop data comprises a first parameter uniquely identifying one of said plurality of FIFO receive data queues and a second parameter comprising data to be popped.

* * * * *

UNITED STATES PATENT AND TRADEMARK OFFICE
CERTIFICATE OF CORRECTION

PATENT NO. : 8,606,976 B2  
APPLICATION NO. : 12/818653  
DATED : December 10, 2013  
INVENTOR(S) : Giuseppe Desoli et al.

Page 1 of 1

It is certified that error appears in the above-identified patent and that said Letters Patent is hereby corrected as shown below:

In the Claims:

At column 13, claim number 1, line number 11, please replace the words [rep sent] with the word -- present --.

Signed and Sealed this
Eighth Day of April, 2014

Michelle K. Lee
*Deputy Director of the United States Patent and Trademark Office*